(12) United States Patent
Singh et al.

(10) Patent No.: US 12,712,587 B2
(45) **Date of Patent: *Aug. 18, 2026**

(54) PASSIVE WEARABLE DEVICE FOR SECURITY AND AUTHENTICATION

(71) Applicant: Dell Products L.P., Round Rock, TX (US)

(72) Inventors: Tejinder Singh, Manotick (CA); Navjot Kaur Khaira, Manotick (CA)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/775,968

(22) Filed: Jul. 17, 2024

(65) Prior Publication Data

US 2026/0025158 A1 Jan. 22, 2026

(51) Int. Cl.
*H04B 1/3827* (2015.01)
*G02B 1/00* (2006.01)

(52) U.S. Cl.
CPC ............. *H04B 1/385* (2013.01); *G02B 1/002* (2013.01)

(58) Field of Classification Search
CPC ................................ H04B 1/385; G02B 1/002
See application file for complete search history.

(56) References Cited

U.S. PATENT DOCUMENTS

| | | | |
|---|---|---|---|
| 2,648,839 | A | 8/1953 | Ford et al. |
| 2,894,261 | A | 7/1959 | Yaru |
| 2,981,949 | A | 4/1961 | Elliott |
| 3,218,644 | A | 11/1965 | Berry |

(Continued)

FOREIGN PATENT DOCUMENTS

| | | | |
|---|---|---|---|
| CN | 114168014 | A | 3/2022 |
| CN | 117044035 | A | 11/2023 |
| EP | 2 495 621 | A1 | 9/2012 |

OTHER PUBLICATIONS

Singh, et al. "Scalable and Compact Metasurface Design for Smart and Functional Wearable Devices" U.S. Appl. No. 18/775,979, filed Jul. 17, 2024, 39 pages.

(Continued)

*Primary Examiner* — An T Nguyen
(74) *Attorney, Agent, or Firm* — Amin, Turocy & Watson, LLP

(57) ABSTRACT

The technology described herein is directed towards a wearable device that includes a passive metasurface that interacts with a transceiver coupled to a computing device, such as a personal computer or laptop. The transceiver transmits a wireless radio frequency signal towards the metasurface integrated into the wearable device, whereby the metasurface reflects an altered instance of the incoming signal back to the transceiver. The radiation pattern of the reflected signal can be distinctly altered per metasurface, providing a distinct signature of that particular metasurface that can be detected by a computing device expecting that signature. The receipt of an expected, matched signal's signature at the computing device, can, for example, facilitate proximity detection of the user, authentication of the user and so on, in a seamless way that is efficient and secure. Various wearable designs for the devices are described, including rings and wristbands that incorporate metasurfaces.

20 Claims, 14 Drawing Sheets

(56) References Cited

U.S. PATENT DOCUMENTS 3,308,467 A 3/1967 Morrison, Jr.
4,518,967 A 5/1985 Westerman
5,579,019 A 11/1996 Uematsu et al.
10,038,690 B2 7/2018 Andrews et al.
10,193,880 B1 1/2019 Jiang et al.
10,497,227 B2 12/2019 Bilal et al.
10,701,067 B1 6/2020 Ziraknejad et al.
11,042,613 B2 6/2021 Deole et al.
11,074,488 B2 * 7/2021 Klimt ............... G06K 19/07762
11,340,392 B1 * 5/2022 Wollack ................. G02B 1/002
11,757,165 B2 9/2023 Shi
11,949,673 B1 4/2024 Sanchez
12,225,026 B1 2/2025 Zhou et al.
12,260,077 B1 3/2025 V et al.
12,407,681 B2 9/2025 Young et al.
2001/0017603 A1 8/2001 Teshirogi et al.
2003/0098815 A1 5/2003 Teshirogi et al.
2005/0038994 A1 2/2005 Johnson et al.
2006/0097942 A1 5/2006 Tanaka et al.
2007/0091004 A1 4/2007 Puuri
2011/0209372 A1 9/2011 Padgett et al.
2012/0056776 A1 3/2012 Shijo et al.
2012/0306711 A1 12/2012 Asplund et al.
2015/0109106 A1 4/2015 Gomez et al.
2015/0222023 A1 8/2015 Shijo et al.
2016/0028715 A1 1/2016 Sivashanmugam et al.
2016/0254396 A1 9/2016 Casse
2019/0132399 A1 5/2019 Henning et al.
2019/0379120 A1 12/2019 Manasson et al.
2020/0005113 A1 * 1/2020 Schnippering ... G06K 19/07777
2020/0012912 A1 1/2020 Klimt
2020/0042977 A1 2/2020 Boulby
2020/0403647 A1 12/2020 Bit-Babik et al.
2021/0028528 A1 1/2021 Alexanian et al.
2021/0258314 A1 8/2021 Tabaja
2022/0078762 A1 3/2022 Machado et al.
2022/0085841 A1 * 3/2022 Grétarsson .............. G06F 3/014
2022/0413587 A1 12/2022 Lagnado et al.
2023/0155812 A1 5/2023 Bennison
2023/0344136 A1 10/2023 Liu et al.
2023/0386245 A1 * 11/2023 Tada .................... G06V 10/955
2024/0214967 A1 6/2024 Zorgui et al.
2024/0248366 A1 7/2024 Cho et al.
2024/0250445 A1 7/2024 Sano
2024/0310561 A1 9/2024 Allen et al.
2024/0387998 A1 11/2024 Wong et al.
2024/0393433 A1 * 11/2024 Elian ....................... G01S 7/412
2024/0402342 A1 * 12/2024 Knapp ................... G06V 10/40
2024/0406752 A1 12/2024 Coskun et al.
2025/0078593 A1 * 3/2025 Beuchat ................. A61B 5/746
2025/0309943 A1 10/2025 Elshafie et al.
2025/0372886 A1 12/2025 Wada et al.
2026/0025172 A1 1/2026 Singh et al.

OTHER PUBLICATIONS

Singh, et al. "Integrated Physical Device Identification for Remote Management of Wearable Metasurfaces" U.S. Appl. No. 18/775,984, filed Jul. 17, 2024, 41 pages.
Singh, et al. "Differentiating Physical Radiation Patterns in Passive Metasurfaces" U.S. Appl. No. 18/775,993, filed Jul. 17, 2024, 40 pages.
Singh, et al. "Customization and Appearance Information for Wearable Metasurfaces" U.S. Appl. No. 18/775,999, filed Jul. 17, 2024, 41 pages.
Singh, et al. "Computer Peripheral With Embedded Transceiver for Proximity Detection of Wearable Metasurfaces" U.S. Appl. No. 18/776,001, filed Jul. 17, 2024, 40 pages.
Singh, et al. "Proximity Based Multifactor Authentication Using Passive Wearable Metasurfaces" U.S. Appl. No. 18/776,007, filed Jul. 17, 2024, 46 pages.
Singh, et al. "Automatic Computing Device Wake up and Lock Using Passive Wearable Metasurface" U.S. Appl. No. 18/776,011, filed Jul. 17, 2024, 45 pages.
Singh, et al. "Software Stack and Backend for Passive Wearable Metasurfaces for Remote Management and Analytics" U.S. Appl. No. 18/776,018, filed Jul. 17, 2024, 50 pages.
Singh, et al. "Activation and Deactivation Detection for a Passive Wearable Metasurface Using a Segmented Ground Plane" U.S. Appl. No. 18/780,245, filed Jul. 22, 2024, 42 pages.
Singh, et al. "Design and Deployment of a Wearable Metasurface With a Segmented Ground Plane" U.S. Appl. No. 18/780,263, filed Jul. 22, 2024, 39 pages.
Singh, et al. "Compact Transceiver With Advanced Beam-Scanning Functionality Based on Leaky Wave Antenna" U.S. Appl. No. 18/780,280, filed Jul. 22, 2024, 37 pages.
Singh, et al. "Aperture Reconfiguration for Transceiver With Beam-Scanning Capability" U.S. Appl. No. 18/780,284, filed Jul. 22, 2024, 37 pages.
Notice of Allowance mailed Mar. 21, 2025 for U.S. Appl. No. 18/780,245, 25 pages.
Office Action mailed Dec. 10, 2025 for U.S. Appl. No. 18/775,984, 28 pages.
Notice of Allowance mailed Oct. 21, 2025 for U.S. Appl. No. 18/776,007, 43 pages.
Notice of Allowance mailed Oct. 24, 2025 for U.S. Appl. No. 18/776,018, 40 pages.
Non-Final Office Action received for U.S. Appl. No. 18/775,993 dated Jan. 28, 2026, 18 pages.
Non-Final Office Action received for U.S. Appl. No. 18/775,999 dated Mar. 23, 2026, 36 pages.
Non-Final Office Action received for U.S. Appl. No. 18/780,280 dated Mar. 11, 2026, 12 pages.
Notice of Allowance received for U.S. Appl. No. 18/775,984 dated Mar. 25, 2026, 6 pages.
"Introducing the New Oura Ring Generation 3" Oura. [https://ouraring.com/blog/oura-generation2-vs-generation3/], retrieved Jul. 3, 2025, 3 pages.
"Galaxy Ring—Galaxy AI is here" Samsung. [https://www.samsung.com/us/rings/galaxy-ring/? msockid=2bb734e76e306246380e20d36f0b63d2], retrieved Jul. 3, 2025, 19 pages.
Singh, et al. "Utilizing Passive Wearable Devices To Capture Device Interaction Data for Supplementary Authentication" U.S. Appl. No. 19/030,562, filed Jan. 17, 2025, 53 pages.
Singh, et al. "Long-Term Pattern Recognition Using Proximity Detection for Security Applications" U.S. Appl. No. 19/056,466, filed Feb. 18, 2025, 49 pages.
Singh, et al. "User Authentication in Computer Devices Through Statistical Analysis of Gesture Data" U.S. Appl. No. 19/170,829, filed Apr. 4, 2025, 40 pages.
Office Action mailed Jun. 3, 2026 for U.S. Appl. No. 19/056,466, 33 pages.
Notice of Allowance mailed Jun. 24, 2026 for U.S. Appl. No. 18/775,993, 48 pages.
Office Action mailed Jun. 29, 2026 for U.S. Appl. No. 18/776,011, 68 pages.
Notice of Allowance mailed Jul. 2, 2026 for U.S. Appl. No. 18/780,280, 85 pages.
Notice of Allowance mailed Jun. 30, 2026 for U.S. Appl. No. 19/030,562, 43 pages.
Notice of Allowance mailed Jun. 30, 2026 for U.S. Appl. No. 19/056,466, 69 pages.

* cited by examiner

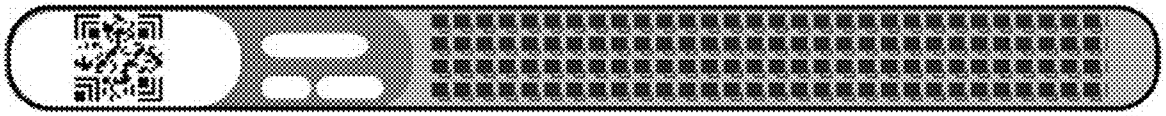
FIG. 12A
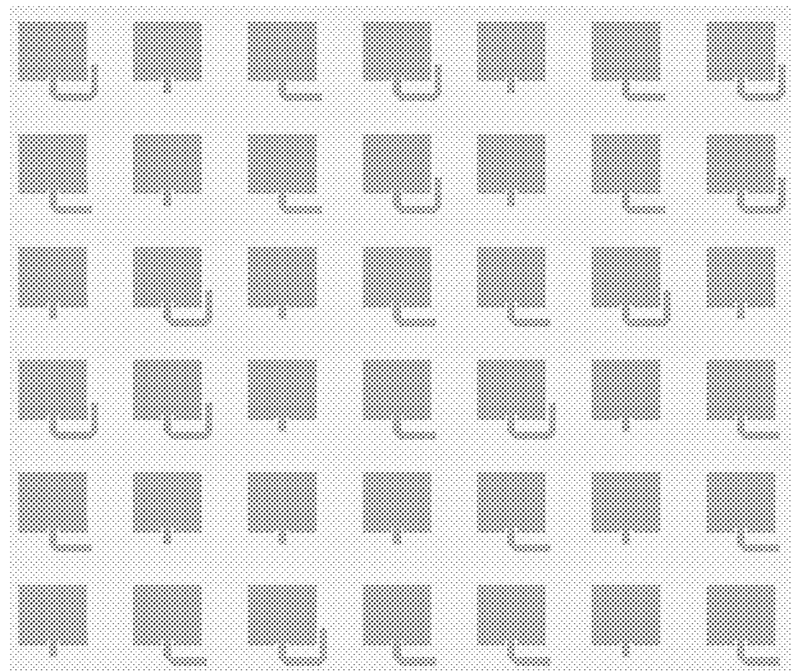
FIG. 12B
| | | | | | | |
|---|---|---|---|---|---|---|
| L | S | M | L | S | M | L |
| L | S | M | L | S | M | L |
| S | L | S | M | M | L | S |
| L | L | S | M | L | S | M |
| M | S | S | S | M | S | M |
| S | M | L | M | M | S | M |
FIG. 12C

PASSIVE WEARABLE DEVICE FOR SECURITY AND AUTHENTICATION

RELATED APPLICATIONS

The subject patent application is related to U.S. patent application Ser. No. 18/775,979, filed Jul. 17, 2024, and entitled "SCALABLE AND COMPACT METASURFACE DESIGN FOR SMART AND FUNCTIONAL WEARABLE DEVICES", U.S. patent application Ser. No. 18/775,984, filed Jul. 17, 2024, and entitled "INTEGRATED PHYSICAL DEVICE IDENTIFICATION FOR REMOTE MANAGEMENT OF WEARABLE METASURFACES", U.S. patent application Ser. No. 18/775,993, filed Jul. 17, 2024, and entitled "DIFFERENTIATING PHYSICAL RADIATION PATTERNS IN PASSIVE METASURFACES", U.S. patent application Ser. No. 18/775,999, filed Jul. 17, 2024, and entitled "CUSTOMIZATION AND APPEARANCE INFORMATION FOR WEARABLE METASURFACES", U.S. patent application Ser. No. 18/776,001, filed Jul. 17, 2024, and entitled "COMPUTER PERIPHERAL WITH EMBEDDED TRANSCEIVER FOR PROXIMITY DETECTION OF WEARABLE METASURFACES", U.S. patent application Ser. No. 18/776,007, filed Jul. 17, 2024, and entitled "PROXIMITY BASED MULTIFACTOR AUTHENTICATION USING PASSIVE WEARABLE METASURFACES", U.S. patent application Ser. No. 18/776,011, filed Jul. 17, 2024, and entitled "AUTOMATIC COMPUTING DEVICE WAKE UP AND LOCK USING PASSIVE WEARABLE METASURFACE", and U.S. patent application Ser. No. 18/776,018, filed Jul. 17, 2024, and entitled "SOFTWARE STACK AND BACKEND FOR PASSIVE WEARABLE METASURFACES FOR REMOTE MANAGEMENT AND ANALYTICS", the entireties of which patent applications are hereby incorporated by reference herein.

BACKGROUND

Existing wearable devices such as rings and wristwatches for activity tracking and/or health monitoring operate by establishing a communication link between the wearable device and a transceiver, generally using BLUETOOTH low energy technology. As such, these devices need electrical components such as a battery, various sensors, circuits, a controller, and antennas within the device, increasing the cost, size, and complexity in design. Moreover, due to the smaller battery size, these wearable devices need to be charged frequently.

BRIEF DESCRIPTION OF THE DRAWINGS

The technology described herein is illustrated by way of example and not limited in the accompanying figures in which like reference numerals indicate similar elements and in which:

FIG. 12A is a representation of an example wearable device in which a distinct device physical radiation pattern signature is included in a device service tag, in accordance with various example embodiments and implementations of the subject disclosure.

FIG. 12B is a representation of example unit cell designs with different length delay lines (stubs) arrayed for a distinct phase profile, in accordance with various example embodiments and implementations of the subject disclosure.

FIG. 12C is a representation of a map of the example unit cell designs with different length delay lines of FIG. 12A, in accordance with various example embodiments and implementations of the subject disclosure.

DETAILED DESCRIPTION

Figure 1A:
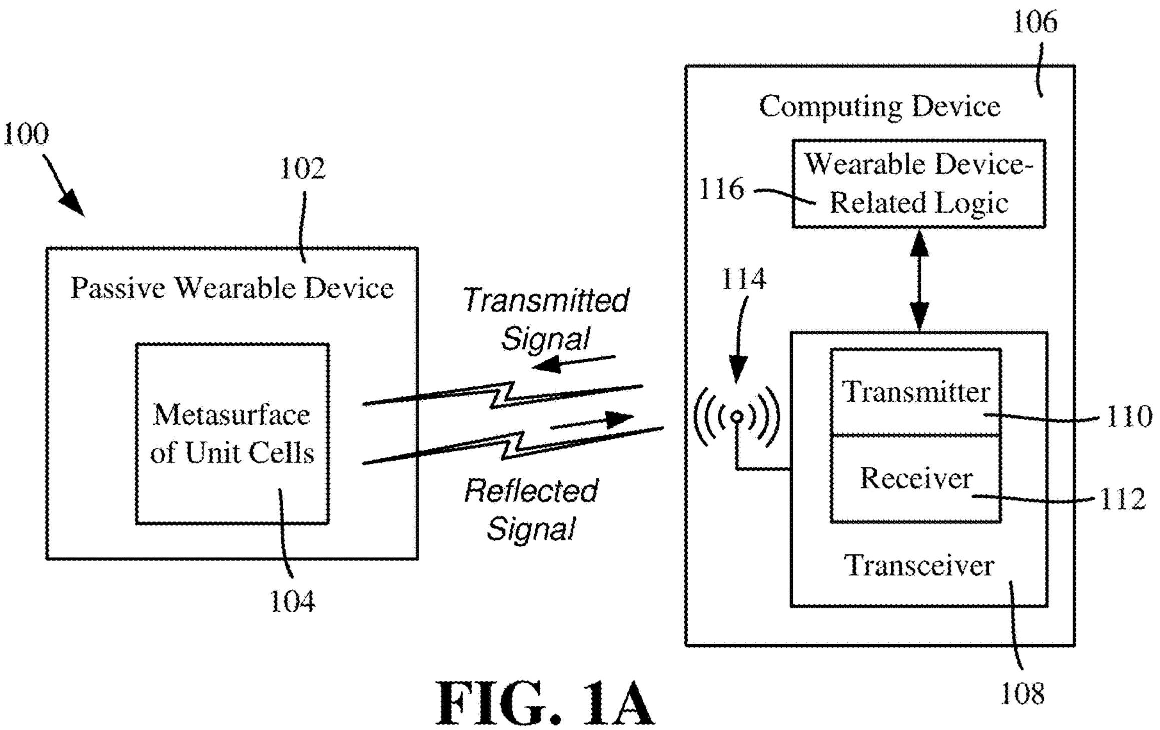
FIG. 1A is a block diagram representation of an example wearable device including a passive metasurface communicating with a computing device via an embedded transceiver, in accordance with various example embodiments and implementations of the subject disclosure.

The technology described herein is generally directed towards a wearable or otherwise portable metasurface that is capable of interacting with a receiver connected to a computing device, such as a personal computer or laptop. In one implementation, the receiver is part of a dedicated transceiver that can be embedded into or otherwise coupled to the computing device.

The transceiver, serving as the system's active component, emits a wireless radio frequency signal towards a metasurface integrated into the wearable device. Upon receiving the signal, the metasurface alters the incoming signal's properties in a predefined manner, and redirects (reflects) the altered instance of the signal back to the transceiver. The receipt of the altered signal at the computing device facilitates detecting the proximity of the user, as well as possibly other actions such as authenticating the user, providing a seamless and intuitive user experience that is both efficient and secure. For example, the computing device can wake up or lock based on the presence or absence of the authenticated user, respectively.

The wearable device embedded with a metasurface or with a metasurface affixed thereto, can become a component in a user's daily attire, for example. Significantly, the wearable device and metasurface can be passive, requiring no internal or external power source to operate as a reflecting device.

By employing very high (e.g., millimeter wave (mmWave) to terahertz (THz)) frequencies, the system ensures that the device is activated only within a specific proximity distance (e.g., on the order of a few feet), enhancing user experience by preventing unintended interactions. One implementation is thus based on using mm Wave to sub-THz frequencies (short range communication) for this operation, which allows for an adequate yet relatively close distance between the user and the transceiver for activation. Furthermore, the metasurface pattern size scales with frequency, resulting in smaller patterns at higher frequencies and larger patterns at lower frequencies. To incorporate the metasurface pattern into a wearable ring, for example, a smaller pattern size is needed relative to a metasurface in a wearable wristband, thus benefitting from operation at higher frequencies, such as sub-THz.

The ability to scale the metasurface pattern with frequency allows for customizable interactions depending on a desired application. Such flexibility potentially can be extended to different forms of communication and control within digital environments, facilitating new types of user-device interfaces.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in RF communications and RF devices in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1A is a block diagram representation of one example implementation of a system 100 in which a wearable device 102, which includes a metasurface of unit cells 104, communicates with a computing device 106. In the example of FIG. 1A, the computing device 106 includes an embedded, integrated or otherwise internal transceiver 108, which in turn includes a transmitter 110 and receiver 112. The transceiver components are coupled to an antenna 114 that transmits signals to the metasurface 104 of the passive wearable device 102, which as described herein, alters a reflected instance of the signal's characteristics to the transceiver's receiver 112. Based on the received signal, wearable device-related logic 116 (e.g., a hardware or software program running in the computing device 106) can analyze the reflected signal and take some action based thereon as described herein, such as to wake the operating system program or the like for execution in the computing device.

Figure 1B:
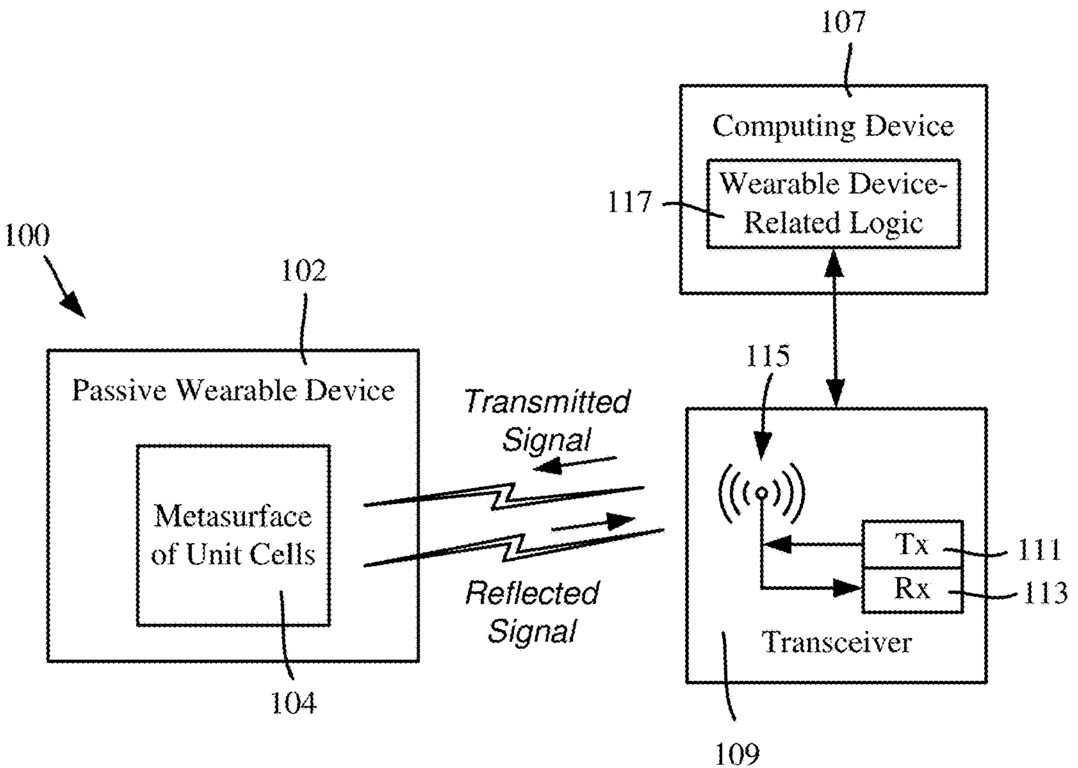
FIG. 1B is a block diagram representation of an example wearable device including a passive metasurface communicating with a computing device via an external transceiver, in accordance with various example embodiments and implementations of the subject disclosure.

FIG. 1B is similar to FIG. 1A, except that a transceiver 109 (transmitter Tx 111/receiver Rx 113) is external to the computing device 107. For example, the external transceiver 109 can be designed as a universal serial bus (USB) device or other suitable device that plugs into a port of the computing device 109.

While a dedicated transceiver is one practical and convenient example, it should be noted that the transmitter and the receiver can be separate components. For example, consider an office setting where a single wall-mounted transmitter can transmit signals to multiple user work locations. Each user can share the same transmitter, yet have his or her own passive wearable device that reflects from the transmitter to a receiver. The users' respective computing devices can have respective external or internal receivers.

Figure 2:
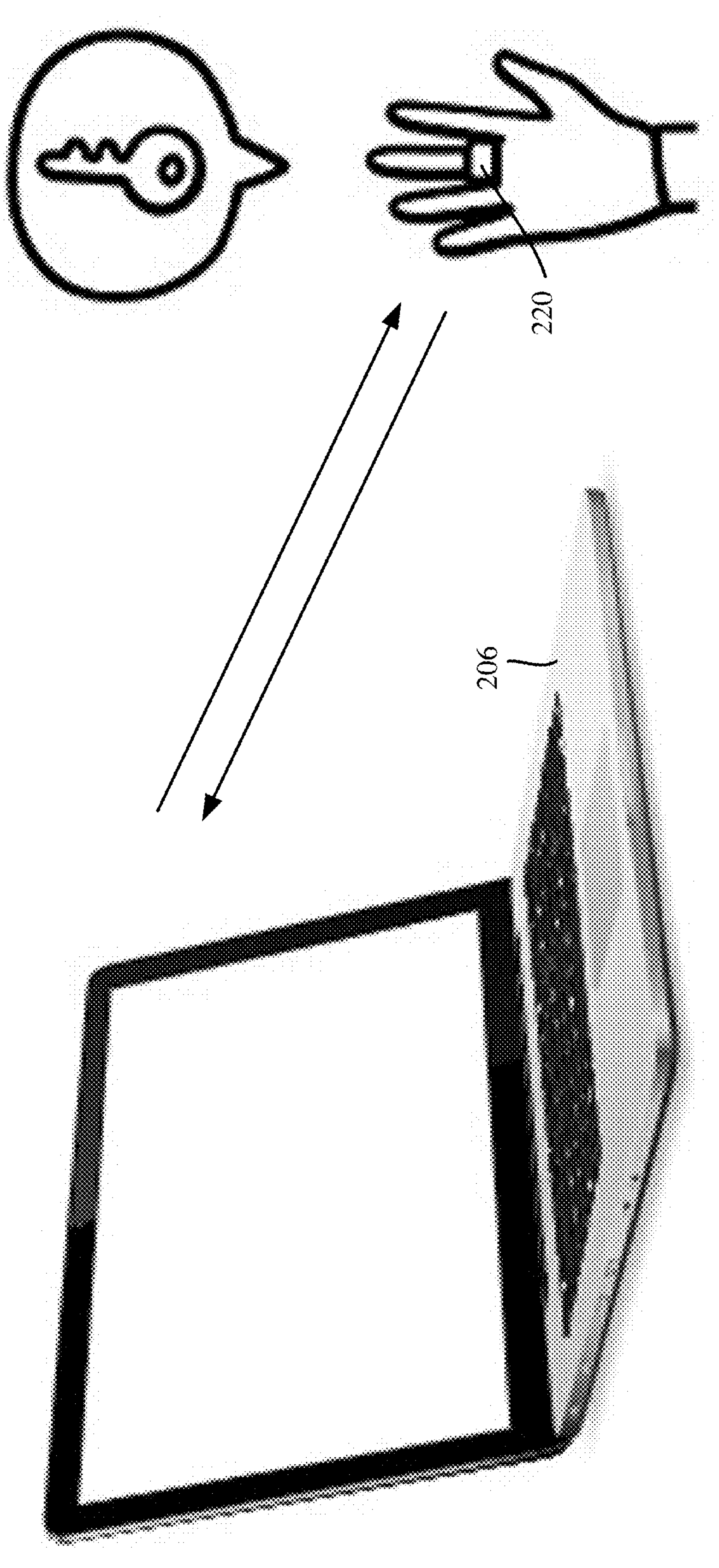
FIG. 2 is a representation of an example wearable device in the form of a ring design, in which the wearable device includes a passive metasurface that acts as a security/authentication key with respect to a computing device, in accordance with various example embodiments and implementations of the subject disclosure.
Figure 3:
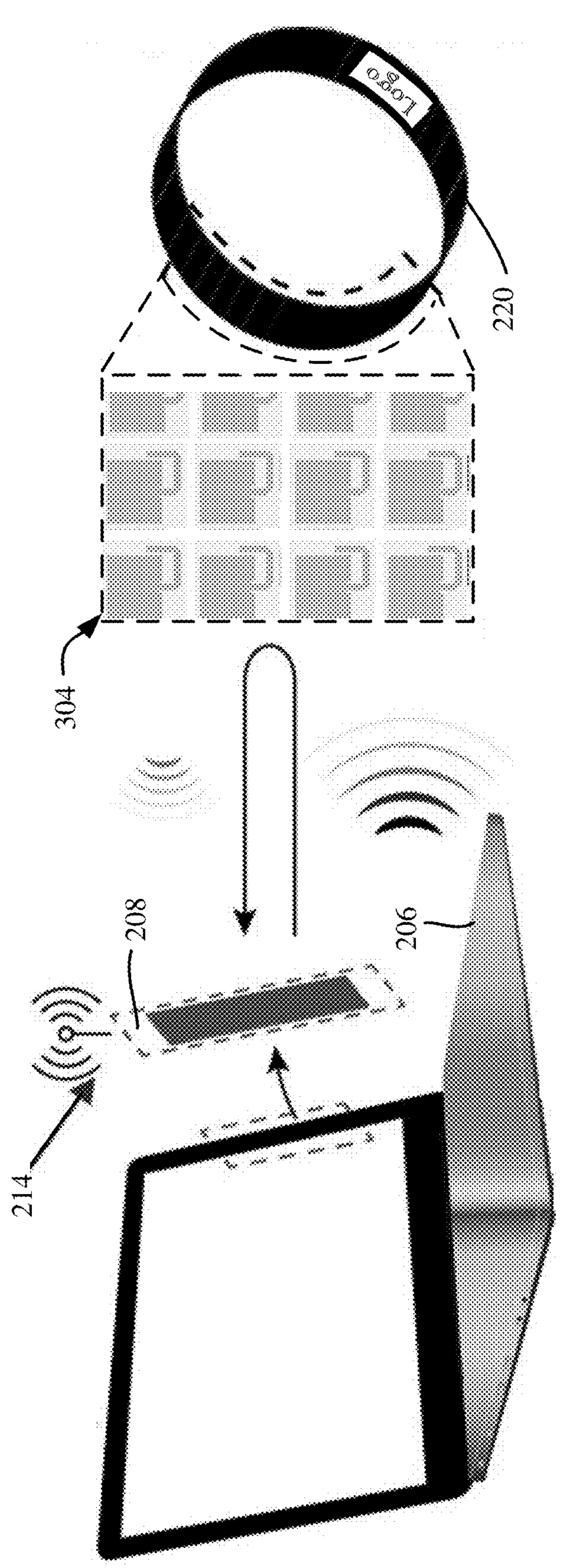
FIG. 3 is a representation of an example wearable device in the form of a ring design, highlighting the passive metasurface communicating with a transceiver embedded in a computing device, in accordance with various example embodiments and implementations of the subject disclosure.

FIGS. 2 and 3 show the general concept of a ring-based wearable metasurface 220 interacting with a laptop computer 206. The ring-based wearable metasurface 220 can act as a key to lock and unlock the computer 206, for example, or at least detect the user's presence to wake the computer 206, such as to automatically open present an interactive lock screen when proximity is detected.

In the example of FIG. 3, a portion of the metasurface unit cells 304 is shown enlarged and interacting with a transceiver 208 (via antenna 214) integrated into the bezel or the like of the computer 206. In general, the user only needs to orient his or her hand at a reasonably close and suitable reflecting angle for the system to operate. Instead of the bezel, the transceiver 208 (or the antenna 214 coupled thereto) can be embedded into the lower portion of the laptop so that when interacting with the keyboard/mouse pad, the user's ring is naturally angled downward in a direction generally towards the antenna.

Figure 4:
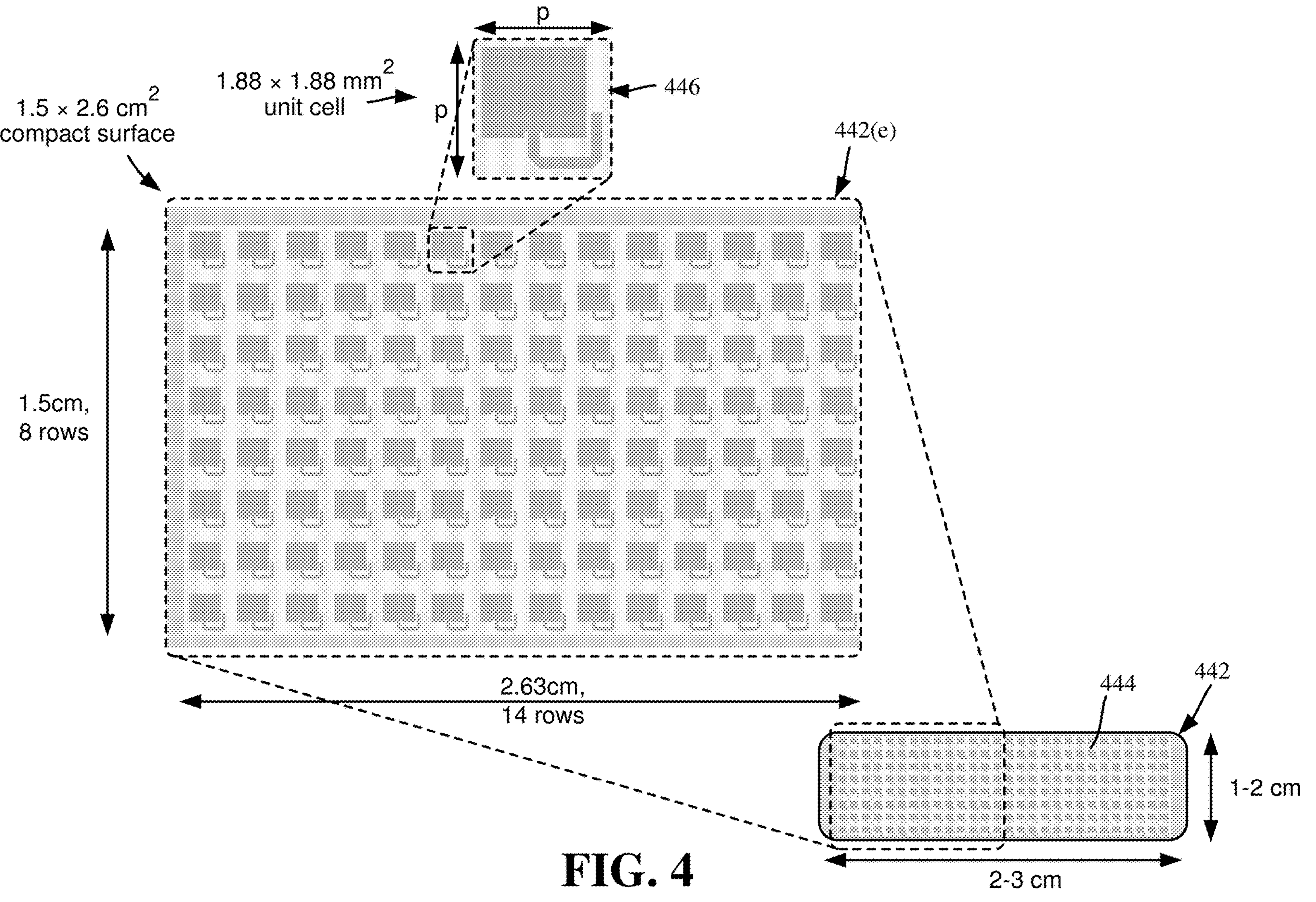
FIG. 4 is a representation of an example surface designed for being implemented at 80 GHz, demonstrating the metasurface's compact and planar features, along with an enlarged portion representation thereof, and an enlarged unit cell representation, in accordance with various example embodiments and implementations of the subject disclosure.

FIG. 4 shows an example wearable device 442 that incorporates a metasurface 444 with an 8×28 array of unit cells. An enlarged portion 442 (*c*) highlighting an 8×14 unit cell array of the metasurface 444 is shown, and one of the unit cells 446 is enlarged.

Figure 5:
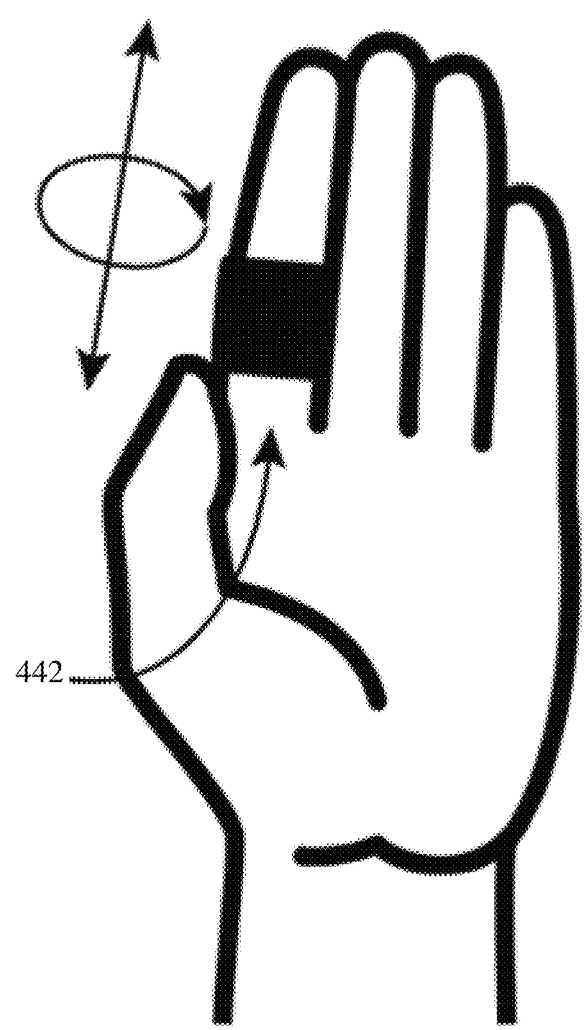
FIG. 5 is a representation of an example wearable device in the form of a ring design showing example dimensions, in accordance with various example embodiments and implementations of the subject disclosure.

In one example implementation, the metasurface is fabricated on flexible material (substrate and metallic ground plane) to facilitate forming the wearable device into a ring shape (FIG. 5) suitable for wearing on a human finger. The dimensions shown in FIGS. 4 and 5 are based on a typical adult finger size and a frequency of 80 gigahertz (GHz). The fabrication tolerance of the metasurface design described herein makes this design easily scalable up to sub-terahertz frequencies, which is suitable for miniaturization to fit on a ring. As shown in FIG. 4, each unit cell in this example measures 1.88 mm×1.88 mm. These unit cells can be arranged in a matrix to fit within a ring that measures 1.5 cm in width and 2 to 3 cm in length when flattened. Additionally, the design is conformal, allowing for adjustments to accommodate bending of the surface, ensuring both flexibility and functionality in wearable applications.

Figure 6A:
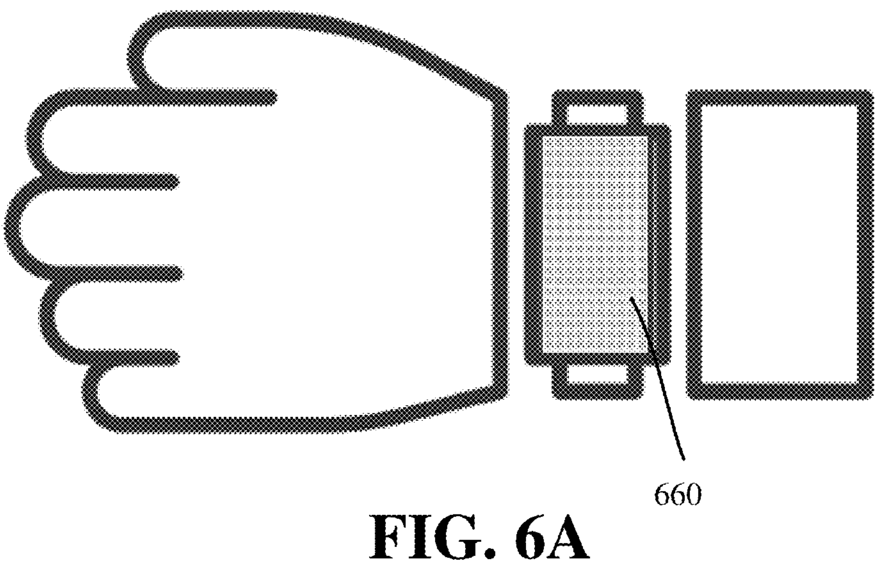
FIG. 6A is a representation of an example wearable device with a passive metasurface in the form of a wrist-wearable (e.g., wristband or bracelet) design, in accordance with various example embodiments and implementations of the subject disclosure.
Figure 6B:
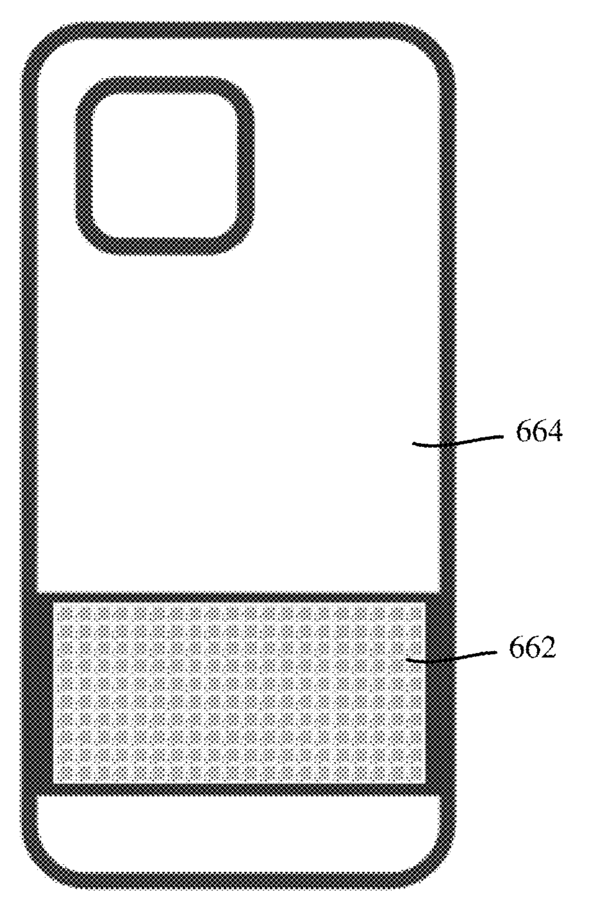
FIG. 6B is a representation of an example passive portable device with a passive metasurface in the form of a design for affixing to a personal item (e.g., cell phone), in accordance with various example embodiments and implementations of the subject disclosure.
Figure 7A:
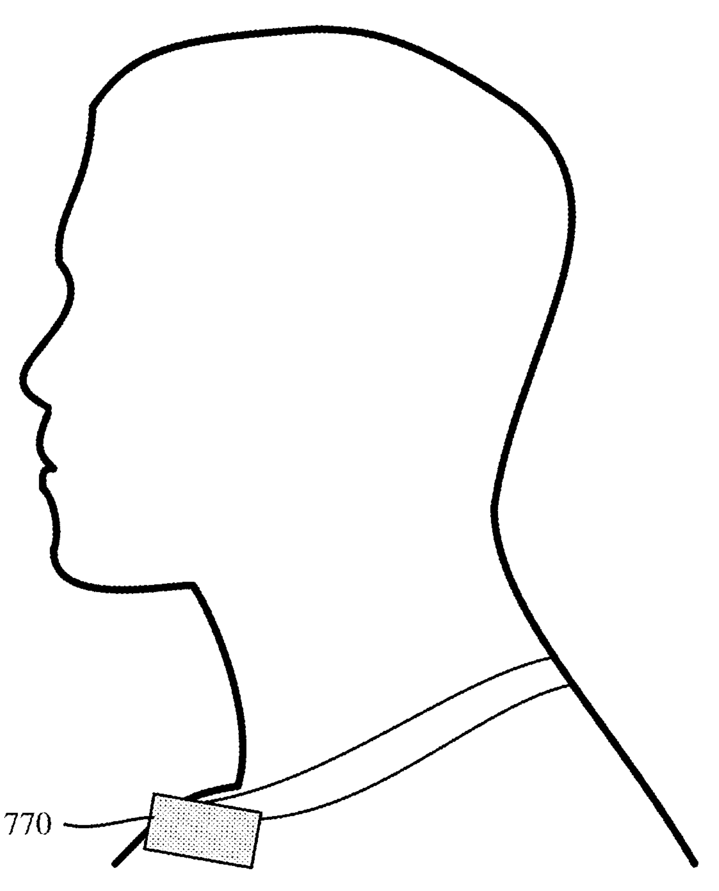
FIG. 7A is a representation of an example wearable device with a passive metasurface in the form of a neck-wearable (e.g., via a lanyard or necklace) design, in accordance with various example embodiments and implementations of the subject disclosure.
Figure 7B:
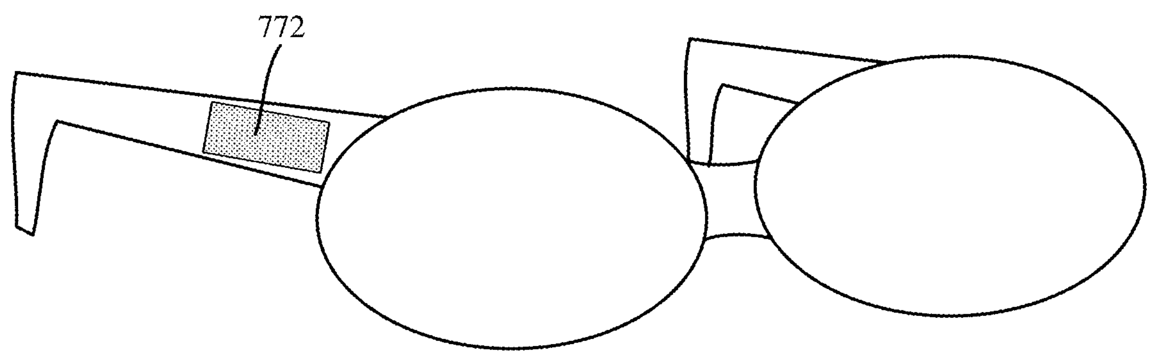
FIG. 7B is a representation of an example portable wearable device with a passive metasurface in the form of a design for affixing to a wearable item (e.g., eyeglass frames), in accordance with various example embodiments and implementations of the subject disclosure.

FIGS. 6A and 6B show alternative, non-limiting examples of wearable devices, namely a wrist-worn (e.g., wristband or bracelet) device 660, and a portable device 662 attached to a cell phone case 664. Although the portable device 662 attached to the cell phone case 664 is not "wearable" in the conventional sense, it can be considered "wearable" to the extent it accompanies a user and is typically part of the user's personal accoutrements that are generally within the user's possession, and indeed, can be "worn" in a user's pocket. FIGS. 7A and 7B show metasurfaces worn around a user's neck (e.g., as a necklace, locket or in lanyard) wearable device 770, and a wearable device 772 affixed to a user's eyeglass frame, respectively. Other non-limiting examples that are not explicitly shown include an identification badge, a name tag patch (e.g., affixed at a conference), a headset or headphones (e.g., regularly worn while working with a computer), and so on. Note that while the metasurface itself is passive, the metasurface can be coupled to a non-passive device, e.g., a watchband of a user's existing battery-powered wristwatch. Some example consideration factors when choosing among the wearable metasurface devices are summarized in the following table:

| User Needs | Product |
|---|---|
| Tranceiver Alignment | Ring |
| Gain | Wrist-worn Device |
| Convenience | Affixed/Embedded to Phone Case |

Figure 8A:
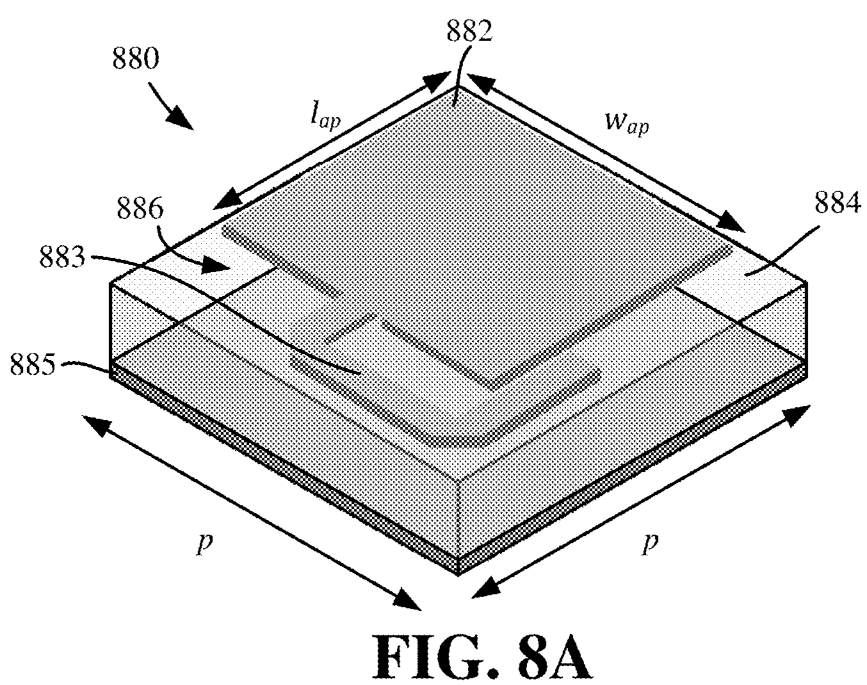
FIG. 8A is a three-dimensional perspective view representation of an example unit cell for a metasurface of a passive wearable device, in accordance with various example embodiments and implementations of the subject disclosure.

FIG. 8A shows a three-dimensional perspective view of one metasurface design 880 that includes a metallic patch element 882 and a metallic phase delay element 883. The metallic patch element 882 and the metallic phase delay element 883 are fabricated atop a substrate 884; a ground plane layer (panel) 885 beneath the substrate 884 in conjunction with the metallic patch element 882 provides an aperture 886 of length $l_{ap}$ and width $w_{ap}$ that facilitates passive operation of the unit cell 880. As is understood, an entire array of unit cells can be fabricated on a single substrate/ground plane.

Figure 8B:
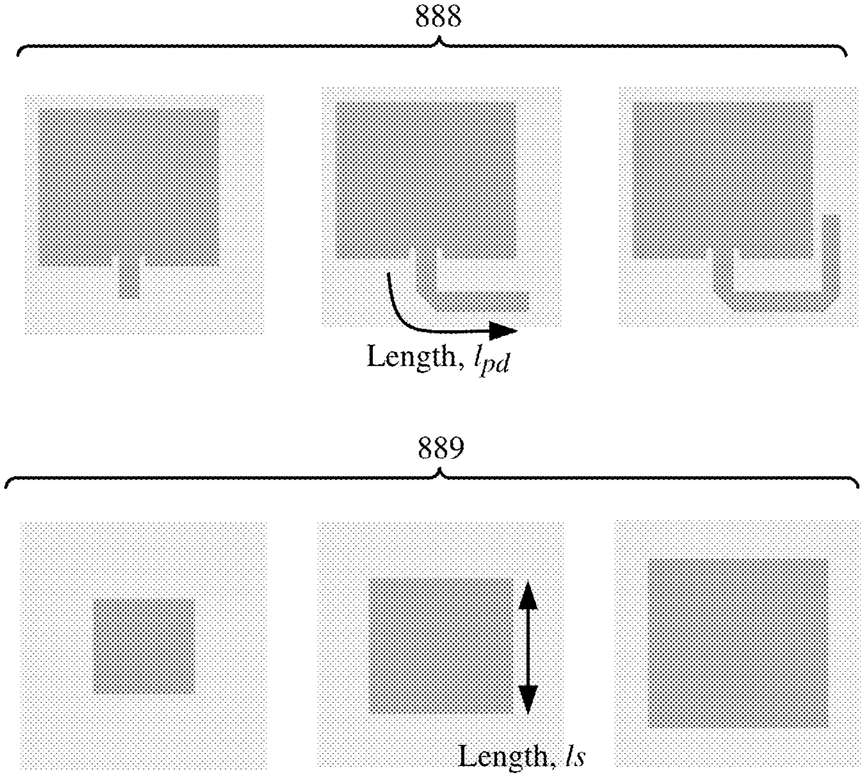
FIG. 8B is a representation of an example unit cell designs with geometry variations for different phase profiles, in accordance with various example embodiments and implementations of the subject disclosure.
Figure 9:
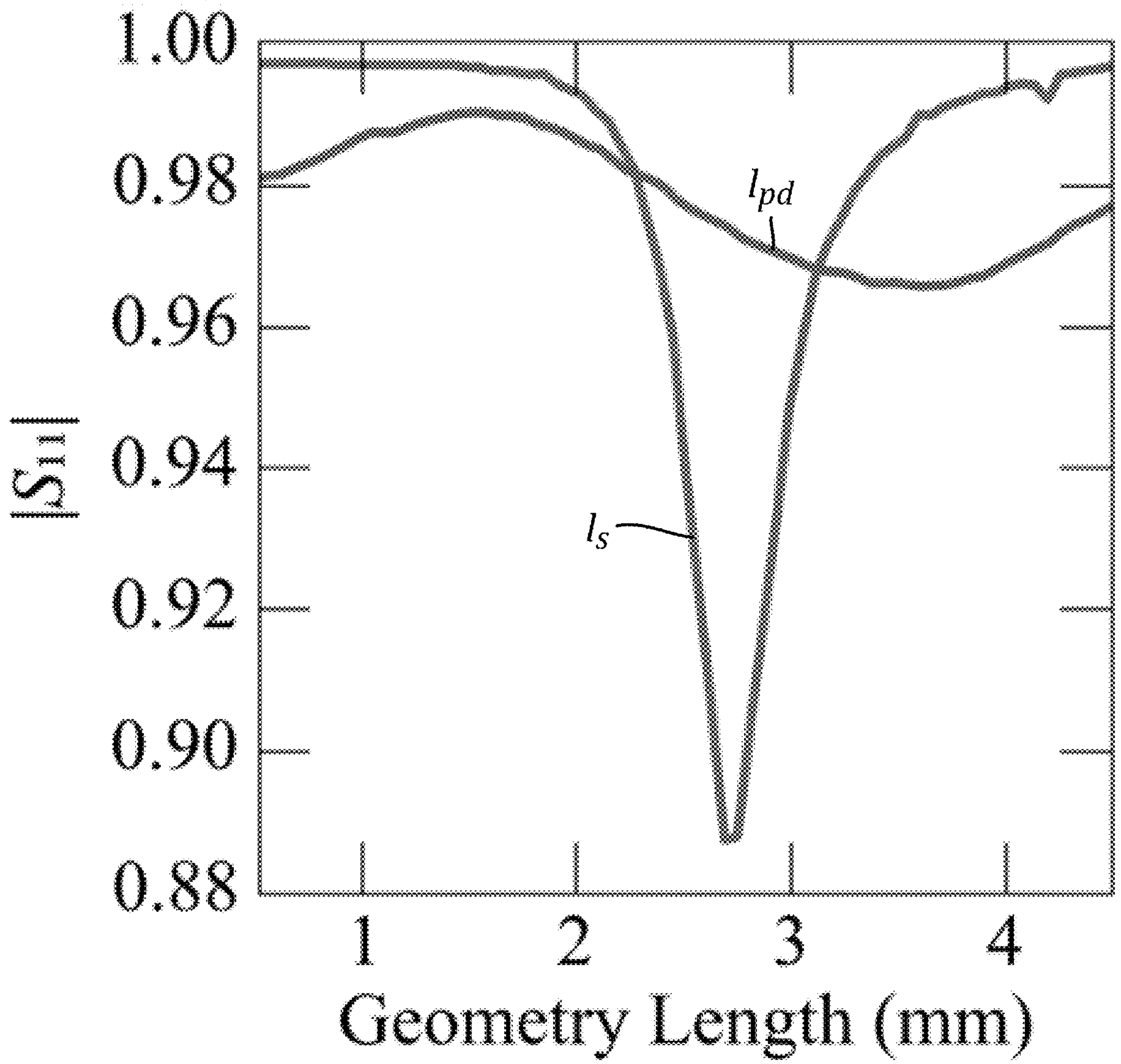
FIG. 9 is a graphical representation of geometry length versus signal reflection for example passive metasurface device designs, in accordance with various example embodiments and implementations of the subject disclosure.
Figure 10:
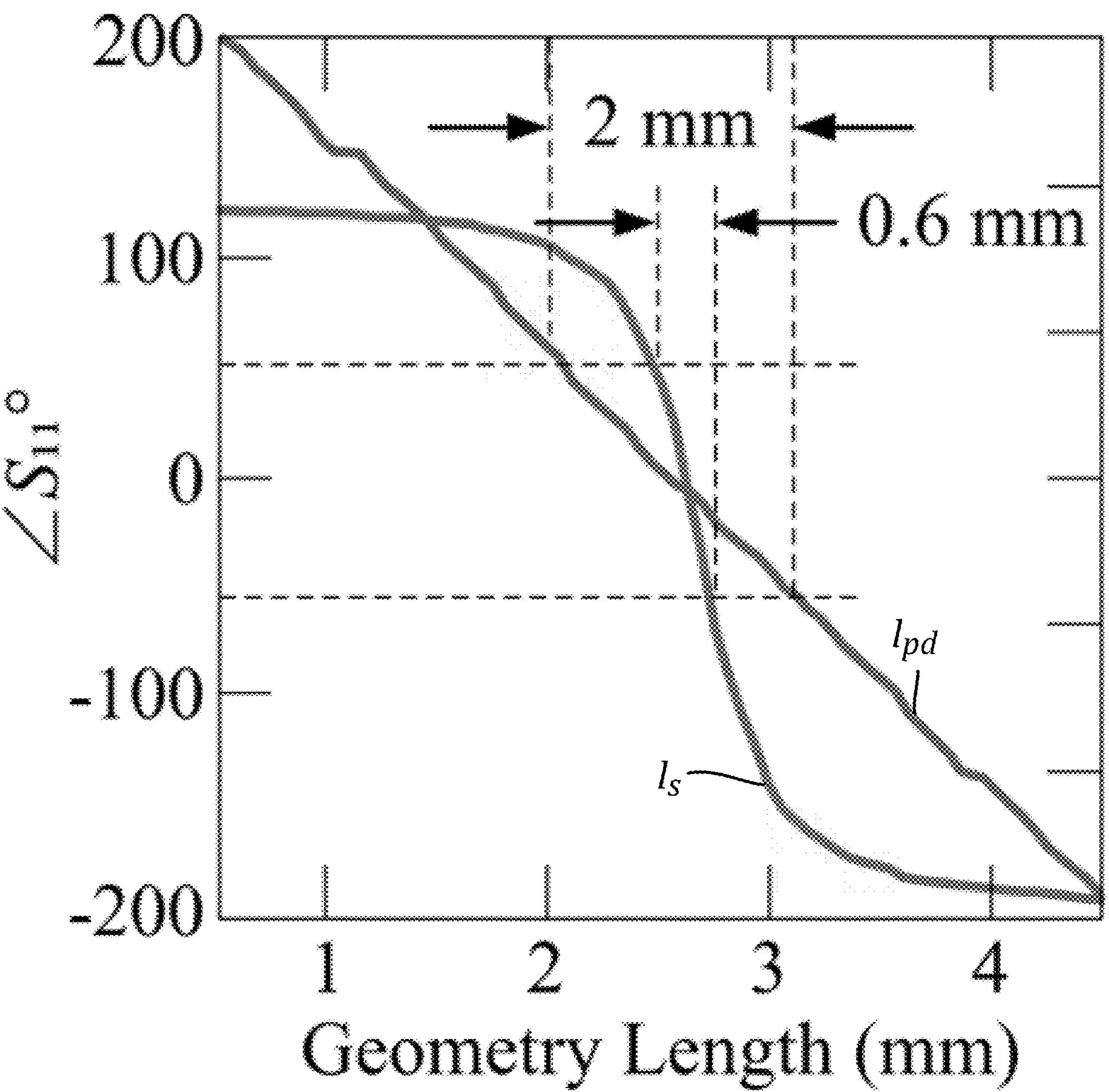
FIG. 10 is a graphical representation of geometry length versus signal reflection angle data for example passive metasurface device designs, in accordance with various example embodiments and implementations of the subject disclosure.

The length of the phase delay element 883 (i.e., metallic stub) adjusts the phase of the reflected signal. Such a phase delay element-based designs (888, FIG. 8B) overcome several challenges that regular variable-patch size approaches (889, FIG. 8B) encounter, as demonstrated by the simulation results shown in FIGS. 9 and 10. The simulation shows a full-wave numerical experiment result for an example unit-cell design using line-delay elements, which demonstrates phase delay element-based phase linearity compared to conventional size variation. The design was originally designed for 30 GHz, with $l_{ap}$=2.93 mm, $w_{ap}$=3.31 mm, and p=5.01 mm More particularly, FIGS. 9 and 10 highlight how the patch size variation approach designs 889 (without delay lines) suffer from phase errors, due to a combined effect of fabrication tolerance and the rapid phase variation near resonance. As shown in FIG. 10, the phase undergoes a 100 degree change within a mere 0.6 mm range. With typical fabrication tolerances between 0.07 to 0.20 mm (3-8 mil), this design is prone to phase errors, particularly at higher frequencies and/or when using cost-effective, lower precision manufacturing techniques. In contrast, the phase delay element designs 888 (FIG. 8B) with delay lines exhibit a flatter amplitude profile and a linear phase trend, as also shown in FIGS. 9 and 10, respectively. The phase shift with the phase delay element design approach 888 is proportional to twice the line length, offering significantly more reliable and consistent performance.

The phase delay element implementation design is appropriate for high frequency operation in that the design reduces the physical size and minimizes interference. More particularly, a metasurface design uses the phase delay element for tuning reflected signals' phase for high frequency operation, which enhances device compactness, aesthetic integration, and reduces interference by avoiding crowded spectral bands. At the same time, the design facilitates straightforward fabrication with the metallic patch element and phase delay element with a conformal design for versatile integration. Designing the length of the phase delay element for tuning not only cases the manufacturing process, but also significantly enhances the fabrication tolerances, which can significantly reduce barriers to innovation and deployment. The metasurface design's conformal nature is beneficial in wearable technology.

A wearable device can have information encoded into its reflected signal based on how the reflected signal is altered by the metasurface relative to the transmitted signal. More particularly, any device can be crafted with a distinct metasurface pattern that distinguishes that metasurface from others. The distinct identifiability of each device is based on its physical radiation characteristics, in that each metasurface can generate a distinct radiation pattern in the reflected signal, which differentiates each such metasurface while ensuring that each metasurface can uniquely interact with the corresponding system.

Figure 11A:
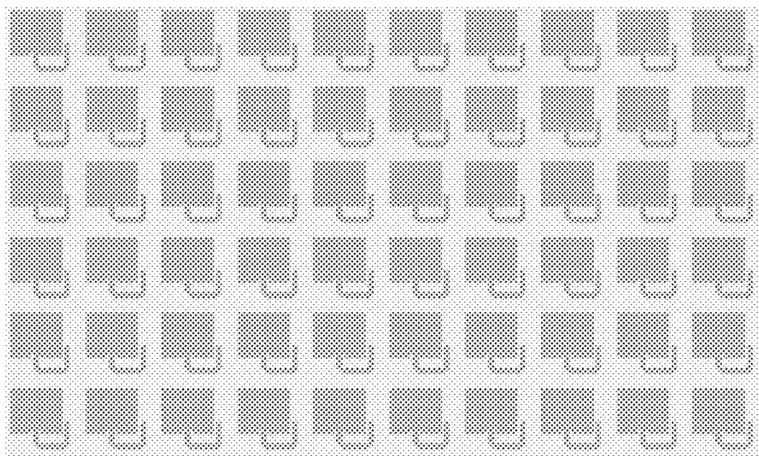
FIGS. 11A-11C are representations of example metasurfaces with various different design parameters to create distinct per device signatures, in accordance with various example embodiments and implementations of the subject disclosure.
Figure 11B:
Figure 11C:
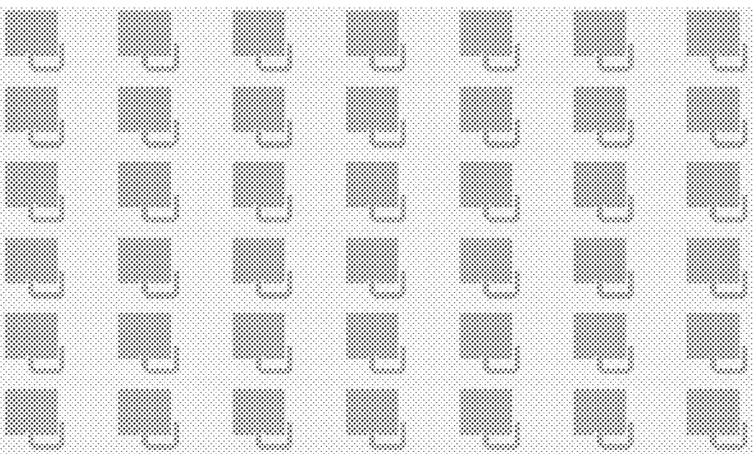

To this end, each device can be manufactured with a system-unique set of metasurface scatters (or simply unit-cells) to provide variations in terms of phase, gain, beam patterns, dual beam splitting, directivity, and the like which can be achieved by altering the unit-cell shape, phase, size, spacing, rotation, among other characteristics, as shown in FIGS. 11A-11C; the characteristics can be unique and randomized/or altered according to a controlled pseudorandom pattern. For example, the example metasurface of FIG. 11A can be considered a standard metasurface, while the more spaced-apart unit cells of FIG. 11B (relative to FIG. 11A) can provide a variation on the beam width. The horizontal spacing and vertical spacing differences in FIG. 11C can result in asymmetric beam splitting based on grating lobes (resulting in variations on the number of reflected beams and their angles).

An advantageous characteristic of the wearable technology described herein is the scalable design of the metasurface, which can be adapted to fit various sizes and types of wearables. The flexibility to customize the size of the metasurface based on the surface area of the wearable item enables a tailored approach to meet specific user needs. Further, as described with refence to FIGS. 11A-11C, there can be a distinct per-device performance signature, possibly globally unique, by which each device is manufactured with a different set of metasurface scatters (i.e., unit-cells) to provide variations in terms of phase, gain, beam patterns, multiple (e.g., dual) beam splitting, directivity and the like, which can be achieved by altering the unit-cell shape, phase, size, spacing, rotation and so forth.

This distinct performance signature can be linked to a system-unique device ID, in which the system expects to detect the predetermined performance signature when the wearable device is linked to the user's computing device and/or associated account. For example, the wearable device-related logic 116 (FIG. 1A) or 117 (FIG. 1B) can look for an expected radiation pattern and match it to a user account; if not matched, or no signal is reflected, metasurface-based access is denied, although another way to access the account may be enabled, such as if the user has forgotten to wear the device. There also can be shared access to a computing device, and thus the logic can map one radiation pattern signature to one authorized user of that computing device and to that user's profile/account, and map a different radiation pattern signature to another authorized user of that computing device and to that other user's profile/account.

Among the benefits of distinct metasurfaces and their corresponding distinct physical radiation patterns is with respect to integrated physics device identification for remote management of wearable metasurfaces. A concern regarding the security of a system as described herein is to ensure that only a specific, authorized wearable device can unlock the system/account, rather than just any wearable device. To address this, each device can be crafted with a different metasurface pattern that distinguishes it from others.

The distinct identifiability via customized radiation characteristics also facilitates the association of a service tag encoding for individual metasurface identification. By way of example, consider that the customized radiation characteristics can encode/correspond to a number of (e.g., seven) alphanumeric characters, that encode the specific differences in each metasurface's design, such as appearance, materials, location, antenna patterns, beam splitting nature, range, and so forth. Individual performance parameters can be encoded as well. An example metasurface with an associated service tag that is also encoded in the customized radiation characteristics is shown in FIG. 12A.

This customization involves distinct radiation patterns generated by each metasurface, tailored specifically to each device ID. This device ID can be incorporated or encrypted within an enterprise's service tag mechanism. For example, because peripherals do not need a separate service tag, a device ID in case of a wearable device is desirable to distinguish the physical features, internal metasurface design patterns, beam patterns, materials, location, and in general for remote management, including activation of the device when purchasing or deactivation in case if the device gets lost.

With respect to improved security and privacy, leveraging the distinct signal manipulation capabilities of metasurfaces, the technology described herein offers an advanced level of security. The complexity and customization potential of the reflected signals make it extremely challenging for unauthorized entities to mimic or hack. Indeed, the different characteristics of each ring or wearable device, achieved through specific customization of the radiation characteristics, can include the beam width (angular scan range) and the asymmetric beam splitting, which varies according to the number of beams and their specific angles. This ensures that each ring interacts individually with the system, providing a secure and personalized method of access.

As a further example, in addition to the spacing differences described with reference to FIGS. 11A-11C, consider the different patterns of unit cell delay line (stub) lengths shown in FIG. 12B. FIG. 12C shows a map of the lengths, e.g., S (short), M (medium) and L (long) which can be distinctly arranged per metasurface. The pattern of the length arrangements of FIG. 12B, which results in one particular phase profile, can be varied for another device, and so on, providing another variable characteristic that modifies the physical radiation pattern of the reflected signal relative to the transmitted signal. Note that while three different delay line lengths are depicted, there can be more than three different lengths, providing even more variations in phase profiles among metasurfaces.

Figure 13:
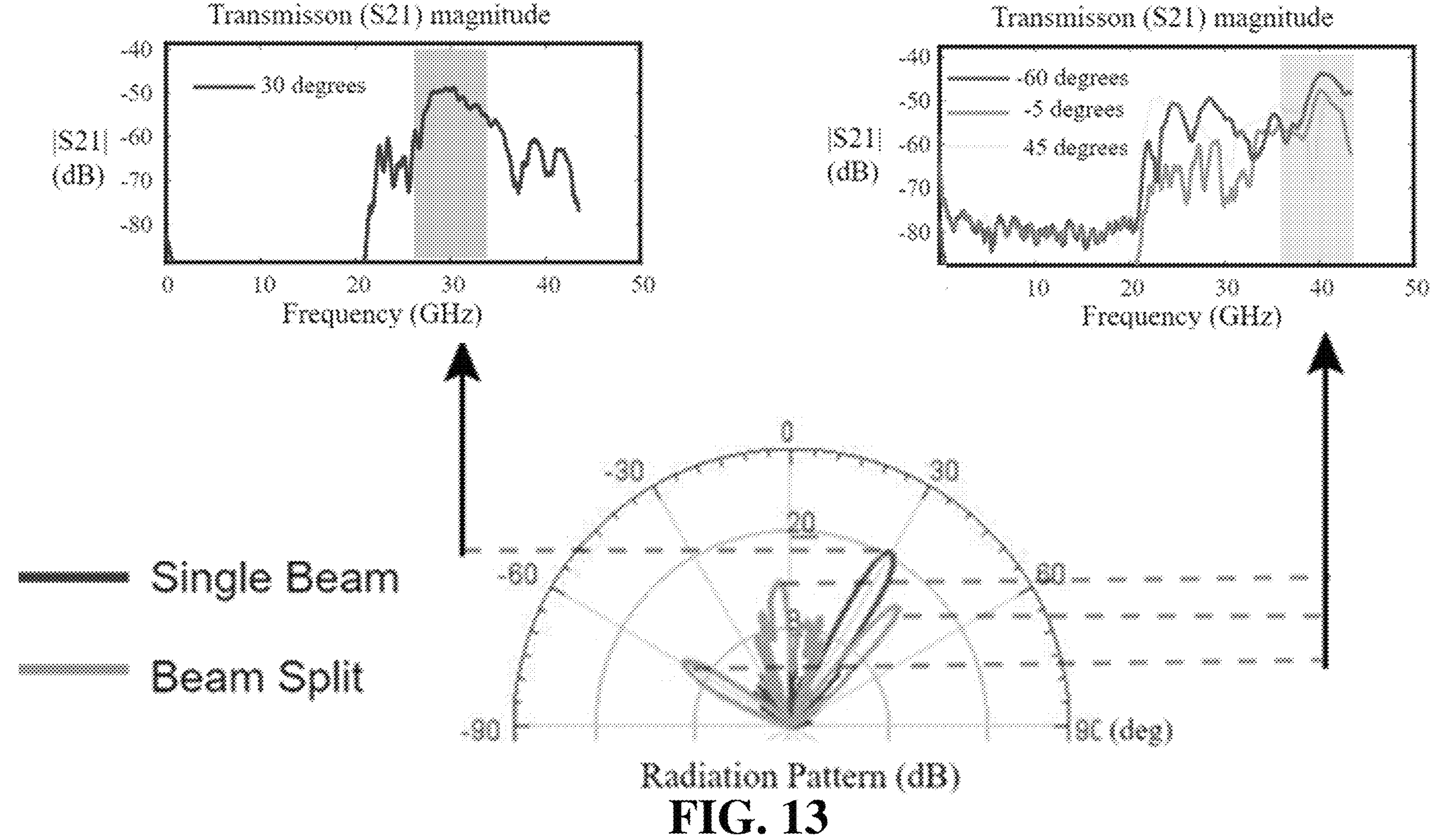
FIG. 13 is a graphical representation of different radiation patterns achieved from an example grating lobe-based beam-splitting metasurface, demonstrating the capability for a single reflected beam or a split beam from a wearable device with a passive metasurface, in accordance with various example embodiments and implementations of the subject disclosure.

FIG. 13 shows a different radiation pattern achieved from a metasurface configured for beam splitting. The frequency is tunable based on the metasurface unit cell size.

One or more example embodiments can be embodied in a device, such as described and represented herein. The device can include a wearable metasurface comprising passive unit cells. The metasurface can be configured to redirect transmitted wireless radio frequency signals, received at the metasurface from a transmitter, as redirected wireless radio frequency signals to a receiver. The passive unit cells can include metallic patches and delay elements that alter at least one property of the redirected wireless radio frequency signals relative to the transmitted wireless radio frequency signals to facilitate proximity detection, by a computing device coupled to the receiver, associated with an authenticated user wearing the wearable metasurface.

The metasurface can include a flexible substrate physically coupled to the passive unit cells, and a flexible ground plane physically coupled to the substrate.

The device can be incorporated into a ring designed for wearing on a finger of the authenticated user.

The device can be incorporated into a band designed for wearing on a wrist of the authenticated user.

The device can be designed for wearing around a neck of the authenticated user, or for a coupling to eyeglass frames wearable by the authenticated user.

The redirected wireless radio frequency signals can be within a defined millimeter wave frequency band.

The redirected wireless radio frequency signals can be within a defined sub-terahertz wave frequency band.

One or more example embodiments can be embodied in a system, such as described and represented herein. The system can include at least one wireless radio frequency transmitter, at least one wireless radio frequency receiver, a computing device coupled to the at least one wireless radio frequency receiver, and a wearable metasurface. The wearable metasurface can include respective passive unit cells that redirect transmitted wireless radio frequency signals, transmitted by the at least one wireless radio frequency transmitter and impinging on at least part of the metasurface, as reflected wireless radio frequency signals for reception by the at least one wireless radio frequency receiver. The respective passive unit cells can include respective elements that alter at least one property of the reflected wireless radio frequency signals relative to the transmitted wireless radio frequency signals to facilitate proximity detection, by the computing device, of a user wearing the wearable metasurface.

The computing device can perform operations to facilitate the proximity detection, and further operations can include, in response to the proximity detection, waking up a program for execution on the computing device. Further operations can include, in response to the proximity detection ceasing for a defined time period, locking the computing device.

The at least one wireless radio frequency transmitter and the at least one wireless radio frequency receiver can include at least one transceiver. The at least one wireless radio frequency transceiver can be incorporated into the computing device.

The metasurface can include a flexible substrate physically coupled to the respective passive unit cells, and a flexible ground plane physically coupled to the substrate; the wearable metasurface can be curved as part of a wearable ring, or curved as part of a wearable wristband.

The reflected wireless radio frequency signals can be within a defined millimeter wave frequency band.

The reflected wireless radio frequency signals can be within a defined sub-terahertz wave frequency band.

The respective elements can include respective delay lines.

Figure 14:
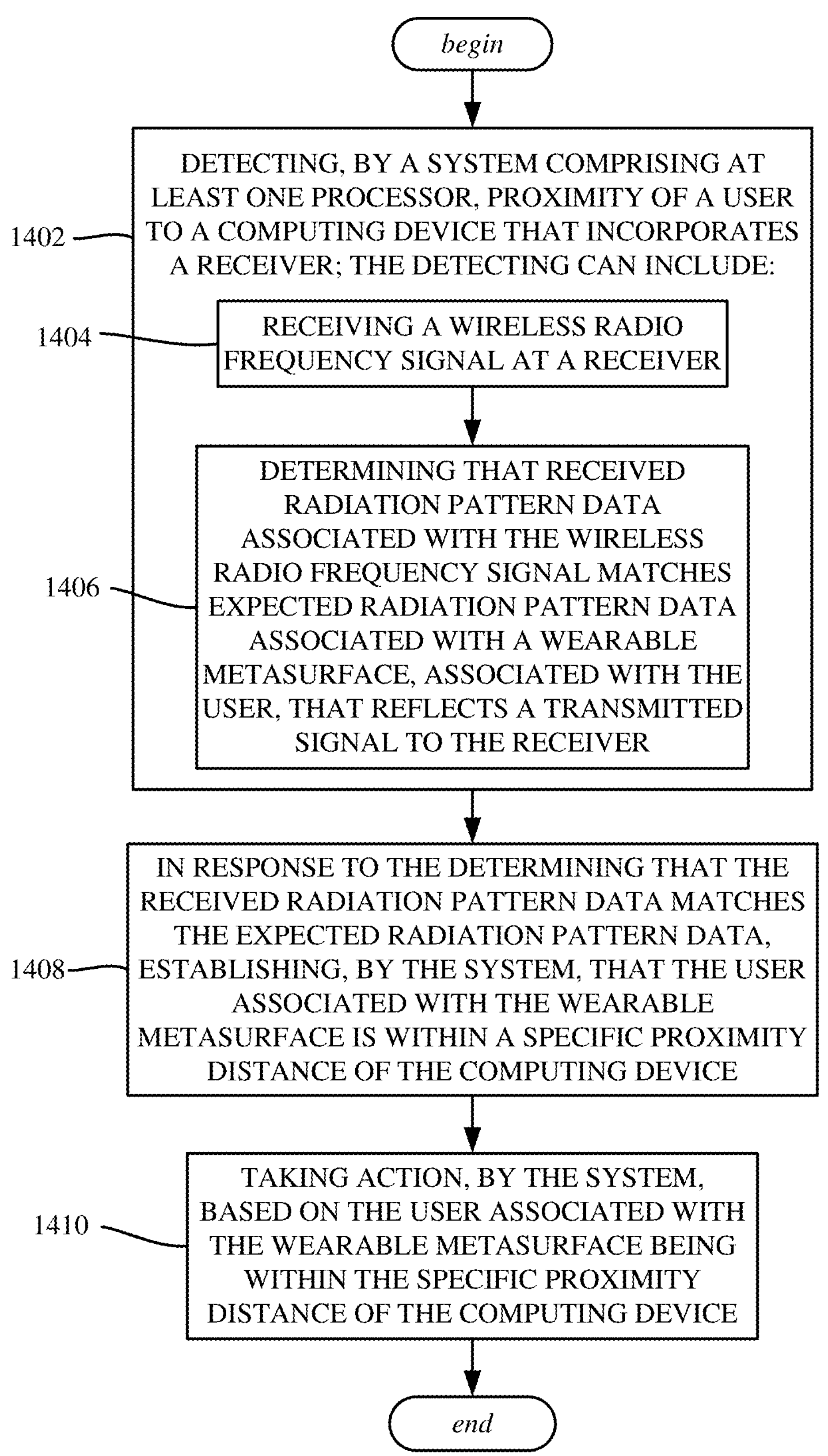
FIG. 14 is a flow diagram showing example operations related to detecting that received radiation pattern data from a wearable metasurface matches expected radiation pattern data, to establish that a user is within a specific proximity distance of the computing device, in accordance with various example embodiments and implementations of the subject disclosure.

One or more example aspects, such as corresponding to example operations of a method, or a system/a machine-readable medium having executable instructions that, when executed by a processor, facilitate performance of the operations, are represented in FIG. 14. Example operation 1402 represents detecting, by a system comprising at least one processor, proximity of a user to a computing device that incorporates a receiver. The detecting can include receiving a wireless radio frequency signal at a receiver (example operation 1404), and determining that received radiation pattern data associated with the wireless radio frequency signal matches expected radiation pattern data associated with a wearable metasurface, associated with the user, that reflects a transmitted signal to the receiver (example operation 1406). Example operation 1408 represents in response to the determining that the received radiation pattern data matches the expected radiation pattern data, establishing, by the system, that the user associated with the wearable metasurface is within a specific proximity distance of the computing device. Example operation 1410 represents taking action, by the system, based on the user associated with the wearable metasurface being within the specific proximity distance of the computing device.

Taking the action can include activating a program on the computing device.

The action can be a first action, and further operations can include detecting, by the system, that the user is no longer within the specific proximity distance of the computing device, and, in response to the detecting that the user is no longer within the specific proximity distance of the computing device, taking a second action.

Determining that the received radiation pattern data matches the expected radiation pattern data can include evaluating the received radiation pattern data associated with the wireless radio frequency signal with respect to at least one of: expected phase data associated with the wireless radio frequency signal, expected gain data associated with the wireless radio frequency signal, expected beam pattern data associated with the wireless radio frequency signal, expected beam splitting data associated with the wireless radio frequency signal, or expected directivity data associated with the wireless radio frequency signal.

As can be seen, the technology described herein is directed to user wearable/portable devices, such as for seamless authentication on digital computing devices such as a laptop/desktop PC. This is implemented through a passive metasurface, to enhance personal security and facilitate seamless interaction with digital environments. Metasurfaces, being engineered interfaces, manipulate electromagnetic waves in ways that traditional materials cannot, without requiring any power source, making them very suitable for passive operations in wearable technology, as well as facilitating distinct radiation patterns per metasurface.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms “component,” “system,” “platform,” “layer,” “selector,” “interface,” and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A device, comprising:

a wearable metasurface comprising passive unit cells, the wearable metasurface configured to redirect transmitted wireless radio frequency signals, received at the wearable metasurface from a transmitter, as redirected wireless radio frequency signals to a receiver, wherein the passive unit cells comprise metallic patches and delay elements that alter at least one property of the redirected wireless radio frequency signals relative to the transmitted wireless radio frequency signals to facilitate proximity detection, by a computing device coupled to the receiver, associated with an authenticated user wearing the wearable metasurface, wherein the computing device performs operations to facilitate the proximity detection, wherein the operations comprise:

in response to the proximity detection, waking up a program for execution on the computing device, and in response to the proximity detection ceasing for a defined time period, locking the computing device.

2. The device of claim 1, wherein the wearable metasurface comprises a flexible substrate physically coupled to the passive unit cells, and a flexible ground plane physically coupled to the substrate.

3. The device of claim 1, wherein the device is incorporated into a ring designed for wearing on a finger of the authenticated user.

4. The device of claim 1, wherein the device is incorporated into a band designed for wearing on a wrist of the authenticated user.

5. The device of claim 1, wherein the device is designed for wearing around a neck of the authenticated user, or for a coupling to eyeglass frames wearable by the authenticated user.

6. The device of claim 1, wherein the redirected wireless radio frequency signals are within a defined millimeter wave frequency band.

7. The device of claim 1, wherein the redirected wireless radio frequency signals are within a defined sub-terahertz wave frequency band.

8. A system, comprising:

at least one wireless radio frequency transmitter;

at least one wireless radio frequency receiver;

a computing device coupled to the at least one wireless radio frequency receiver; and a wearable metasurface comprising respective passive unit cells that redirect transmitted wireless radio frequency signals, transmitted by the at least one wireless radio frequency transmitter and impinging on at least part of the wearable metasurface, as reflected wireless radio frequency signals for reception by the at least one wireless radio frequency receiver, wherein the respective passive unit cells comprise respective elements that alter at least one property of the reflected wireless radio frequency signals relative to the transmitted wireless radio frequency signals to facilitate proximity detection, by the computing device, of a user wearing the wearable metasurface, wherein the computing device performs operations to facilitate the proximity detection, wherein the operations comprise:

in response to the proximity detection, waking up a program for execution on the computing device, and in response to the proximity detection ceasing for a defined time period, locking the computing device.

9. The system of claim 8, wherein the at least one wireless radio frequency transmitter and the at least one wireless radio frequency receiver comprise at least one transceiver.

10. The system of claim 9, wherein the at least one wireless radio frequency transceiver is incorporated into the computing device.

11. The system of claim 8, wherein the wearable metasurface comprises a flexible substrate physically coupled to the respective passive unit cells, and a flexible ground plane physically coupled to the substrate, and wherein the wearable metasurface is curved as part of a wearable ring, or curved as part of a wearable wristband.

12. The system of claim 8, wherein the reflected wireless radio frequency signals are within a defined millimeter wave frequency band.

13. The system of claim 8, wherein the reflected wireless radio frequency signals are within a defined sub-terahertz wave frequency band.

14. The system of claim 8, wherein the respective elements comprise respective delay lines.

15. A method, comprising:

detecting, by a system comprising at least one processor, proximity of a user to a computing device that incorporates a receiver, the detecting comprising:

receiving a wireless radio frequency signal at a receiver, and determining that received radiation pattern data associated with the wireless radio frequency signal matches expected radiation pattern data associated with a wearable metasurface, associated with the user, that reflects a transmitted signal to the receiver;

in response to the determining that the received radiation pattern data matches the expected radiation pattern data, establishing, by the system, that the user associated with the wearable metasurface is within a specific proximity distance of the computing device;

taking a first action, by the system, based on the user associated with the wearable metasurface being within the specific proximity distance of the computing device, wherein the taking of the first action comprises activating a program on the computing device;

detecting, by the system, that the user is no longer within the specific proximity distance of the computing device; and in response to the detecting that the user is no longer within the specific proximity distance of the computing device, taking, by the system, a second action.

16. The method of claim 15, wherein the determining that the received radiation pattern data matches the expected radiation pattern data comprises evaluating the received radiation pattern data associated with the wireless radio frequency signal with respect to at least one of: expected phase data associated with the wireless radio frequency signal, expected gain data associated with the wireless radio frequency signal, expected beam pattern data associated with the wireless radio frequency signal, expected beam splitting data associated with the wireless radio frequency signal, or expected directivity data associated with the wireless radio frequency signal.

17. The system of claim 8, wherein the wearable metasurface comprises a flexible substrate physically coupled to the passive unit cells, and a flexible ground plane physically coupled to the substrate.

18. The system of claim 1, wherein the system is incorporated into a ring designed for wearing on a finger of the user, or incorporated into a band designed for wearing on a wrist of the user.

19. The system of claim 1, wherein the system is designed for wearing around a neck of the user, or for a coupling to eyeglass frames wearable by the user.

20. The system of claim 1, wherein the redirected wireless radio frequency signals are within a defined millimeter wave frequency band or a defined sub-terahertz wave frequency band.

* * * * *